United States Patent

[11] 3,615,852

[72] Inventors: Johann Gehring, Erlangen; Karl Strasser, Nurnberg, both of Germany
[21] Appl. No.: 872,706
[22] Filed: Oct. 30, 1969
[45] Patented: Oct. 26, 1971
[73] Assignee: Siemens Aktiengesellschaft, Berlin and Munich, Germany
[32] Priority: Nov. 2, 1968
[33] Germany
[31] P 18 06 794.2

[54] FUEL CELL
10 Claims, 3 Drawing Figs.
[52] U.S. Cl. .................................. 136/86 R
[51] Int. Cl. .................................. H01m 27/02
[50] Field of Search .......................... 136/86; 204/275-278

[56] References Cited
UNITED STATES PATENTS
3,375,138  3/1968  Mather, Jr. .................. 136/86 R FOREIGN PATENTS
1,481,976  4/1967  France ...................... 136/86 R
456,704    7/1968  Germany .................... 136/86 R
196,140    5/1967  U.S.S.R. ................... 136/86 D Primary Examiner—Allen B. Curtis
Attorneys—Curt M. Avery, Arthur E. Wilfond, Herbert L. Lerner and Daniel J. Tick ABSTRACT: Fuel cell includes a pair of electrodes spaced from one another, a porous support skeleton having electron-nonconductive cover layers at opposite sides thereof disposed in the space between the electrodes and containing fluid electrolyte, a metal profile frame carrying the support skeleton and provided with at least one supply duct and one discharge duct for electrolyte, and an elastic metal frame carrying each of the electrodes and located adjacent the frame for the support skeleton and separated therefrom by the respective electrically nonconductive cover layer, the frame for the electrodes being provided with respective supply and discharge ducts for fuel cell reactants.

FUEL CELL

Our invention relates to a fuel cell and, more particularly, a fuel cell with electrodes between which there is disposed a porous support skeleton provided with cover layers on opposing sides thereof and containing a liquid electrolyte, as well as to a fuel battery formed of a series connection of such fuel cells.

Fuel elements with electrodes located on opposite sides of a support skeleton are known from the French Pat. No. 1,419,577.

In the French Pat. of Addition No. 89,422, it has already been proposed to provide the support skeleton, at least on one side thereof, with an ion-conductive cover layer that is gastight in the condition thereof wherein it is saturated with electrolyte. The support skeleton and the electrodes are generally embedded in a frame made of plastic material and formed with individual bores through which the electrolyte or the reactants are supplied to the support skeleton or the electrodes. Circular tie rings are generally employed for sealing the nonconductive cover layers as well as the fuel cells that are assembled into a battery and clamped together with bolts.

It has been found that, during operation of fuel cells, especially fuel batteries, with support skeletons or electrodes or both cast in frames formed of plastic material, marked deformations are produced due to thermal and mechanical stress loading so that cracks or rifts are produced in the frames and the plastic material thereof becomes pervious to the electrolyte or the reactants. This is particularly the case when the fuel cells are operated at very high temperatures, such as above 80° C.

It is accordingly an object of our invention to provide a fuel cell which avoids the foregoing disadvantages of the previously known fuel cells of this general type. More particularly, it is an object to provide such a fuel cell whose frame will not become pervious to electrolyte or reactants.

With the foregoing and other objects in view, we accordingly provide fuel cell comprising a pair of electrodes spaced from one another, a porous support skeleton having electrically nonconductive cover layers at opposite sides thereof disposed in the space between the electrodes and containing fluid electrolyte, a metal profile frame carrying the support skeleton and provided with at least one supply duct and one discharge duct for electrolyte, and an elastic metal frame carrying each of the electrodes and located adjacent the frame for the support skeleton and separated therefrom by the respective electrically nonconductive cover layer, the frames for the electrodes being provided with respective supply and discharge ducts for fuel cell reactants.

According to another feature of our invention, electrode chambers are located on the respective side of the electrodes opposite from the support skeleton, the chambers being enclosed by a plate member, and the elastic metal frame being firmly connected to the plate member.

According to further features of our invention, the cover layers are formed of asbestos and, at least in the regions thereof located between the metal frames, are hydrophobic, i.e., are impregnated with suitable dispersions or solutions of plastic material.

According to additional features of the invention, the electrodes are formed of fine-mesh screens consisting of catalytically active material or having highly active catalytic material applied thereto. Electrodes of pulverulent catalyst material such as of Raney nickel, Raney silver, silver, catalyst-impregnated carbon or DSK material have also been found to be especially suitable in accordance with the invention. Furthermore, according to our invention, thin foils that are electron-conductive and hydrogen-permeable are also employed for the electrodes; however, due to their mechanical instability, they must be suitably supported.

Other features which are considered as characteristic for the invention are set forth in the appended claims.

Although the invention is illustrated and described herein as embodied in fuel cell, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing, in which.

Figure 1:
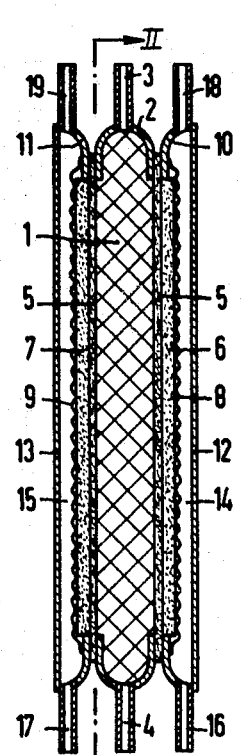
FIG. 1 is a schematic sectional view of a fuel cell constructed according to our invention.
Figure 2:
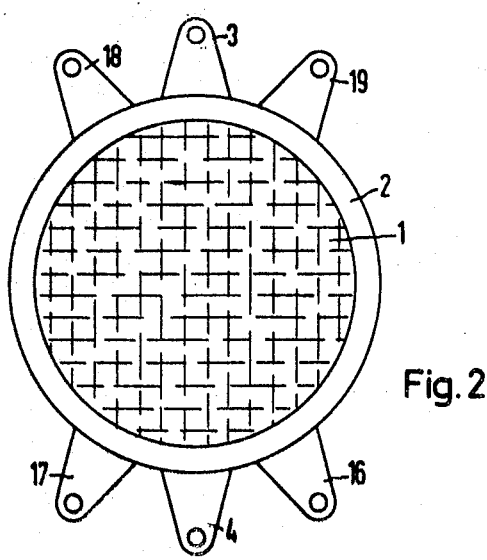
FIG. 2 is a cross-sectional view of FIG. 1 taken along the line II—II in the direction of the arrows.

Referring now to the drawing, and first particularly to FIGS. 1 and 2 thereof, there is shown schematically a fuel cell constructed in accordance with our invention having a support skeleton 1 that is received in a metal profile ring 2. The support skeleton 1 is formed of one or more nickel-wire screens of the same or different mesh size. The profile ring 2 is of sheet steel or nickel having a sheet thickness of 0.15 to 0.35 mm. Two double-walled straps or tongues 3 and 4 are located at the outer edge of the metal profile ring 2 and form electrolyte supply and discharge ducts, respectively, for the support skeleton. In the embodiment illustrated in FIG. 1 of the drawing, both double-walled duct members 3 and 4 are located diametrically opposite one another on the profile ring 2. A cover layer 5 of asbestos fiber paper is located on opposite sides of the support skeleton 1, as shown in FIG. 1. The asbestos papers 5 are expediently hydrophobic, produced, for example, by impregnating them with a suitable dispersion or solution of plastic material, at regions thereof bordering on the metal ring 2. The asbestos cover layers 5 serve both for sealing the fuel cell and for electrically insulating electrodes 6 and 7 located on the respective sides of the asbestos layers 5 that face away from the support skeleton 1. The electrodes 6 and 7 are formed of pulverulent catalyst material, and metal screening 8 and 9 presses the pulverulent catalyst material against the asbestos cover layers 5. Ring-shaped metal frames 10 and 11 are provided for respectively carrying the pulverulent electrodes 6 and 7 as well as the respective metal screens 8 and 9. The metal frames 10 and 11 are firmly connected, for example, by welding, soldering or adhesive, to respective plate members 12 and 13 which enclose the respective electrode chambers 14 and 15 that are located on that side of the respective electrodes 6 and 7 facing away from the support skeleton 1. Fuel cell reactant gases are supplied respectively to the electrode chambers 14 and 15 through the ductlike double-walled tongues or straps 16 and 17, and are discharged therefrom through similar double-walled straps 18 and 19 located diametrically opposite thereto on the respective ringlike frames 10 and 11. The screens 8 and 9 serve both for supporting the pulverulent catalyst material of the electrodes 6 and 7 as well as for partially defining the respective electrode chambers 14 and 15.

Although it is clear from the cross-sectional view of the fuel cell of our invention shown in FIG. 2 that the metal profile ring 2 and, accordingly, the metal frame 10 as well as the metal frame 11 are circular in shape, it is of course obvious that they can also be polygonal in shape, such as square, for example.

Figure 3:
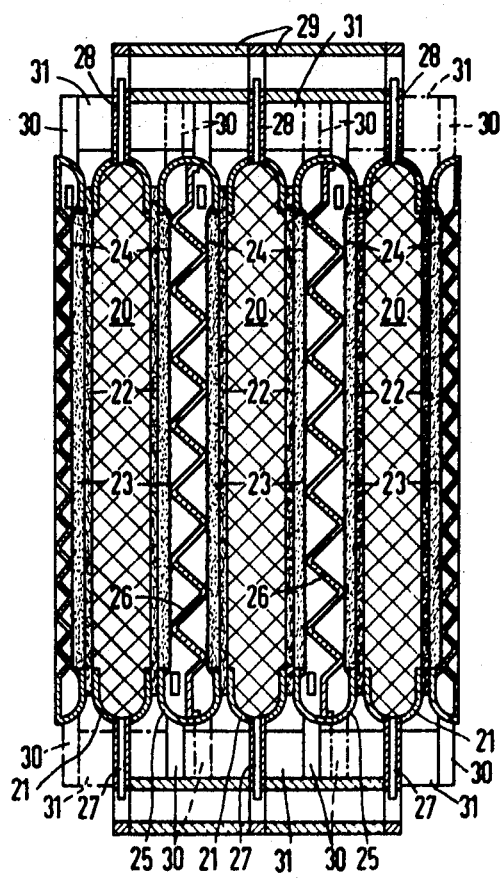
FIG. 3 is a schematic sectional view of a fuel battery formed of serially connected fuel cells that are slight modifications of the fuel cell of FIG. 1.

The fuel battery of FIG. 3 is made up of serially connected fuel cells constructed according to our invention, respective pairs of electrodes of dissimilar polarity being joined as one component so as to form a bipolar electrode. The pulverulent catalyst material 23 retained by fine-mesh screens 24 is located on both sides of respective contact plates 26 which are formed with suitable grooves or are of wave-shaped configuration.

In the embodiment of the fuel battery, shown in FIG. 3, the support skeletons 20 are shown as being carried by metal profile frames 21 and as having cover layers 22 of asbestos fiber on both sides thereof. The fine-mesh screens 24 that force the pulverulent catalyst material 23 against the respective cover layers 22 serve simultaneously as current conductors. The wave-shaped contact plates 26 are suitably secured in the metal frames 25, for example, by welding, soldering or the like. Ducts 27 and 28, corresponding to the double-walled tongues or straps 3 and 4 of the fuel cell shown in FIGS. 1 and 2, respectively serve for feeding and discharging electrolyte from the respective support skeletons 20 and are connected to one another through the connecting member or manifold 29. In analogous manner, the supply and discharge ducts for the fuel cell reactants, i.e., hydrogen and oxygen, corresponding to the respective double-walled tongues or straps 16 through 19 of the fuel cell of FIGS. 1 and 2, are connected by connecting members or manifolds 31 in the embodiment of the fuel battery shown in FIG. 3.

By employing metal frames instead of the heretofore employed frames of plastic material, important unexpected advantages are produced in the construction of fuel cells and batteries. For example, the material of the frame can consequently be accommodated to that of the support skeleton so that thermal coefficients of expansion of both metal materials are the same or deviate only very slightly from one another. The difficulties arising in the cast fuel cells due to the different thermal coefficients of expansion of plastic material and metal, can thus be avoided in a relatively simple manner. According to the aforedescribed embodiment of our invention, the metal frames and the support skeleton are formed of the same metal, such as nickel or steel for example, which is resistant to the corrosive action of the liquid electrolyte, such as potassium hydroxide, for example.

The metal frames, according to our invention, behave elastically and can be accommodated well to the respective operating conditions of the fuel cell or battery. Accordingly, for example, a uniform compressive force can be applied thereby to components within a fuel cell, which has a very favorable effect, especially in the case of pulverulent catalyst material whose electrochemical behavior is influenced by the pressure applied thereto. Due to the elasticity of the components, furthermore, the fuel batteries are able to be all-the-more readily assembled. Moreover, a favorable weight-to-volume ratio can thereby be established.

A further advantage of the fuel cell and battery constructed according to our invention, is that they can be employed without difficulty even at relatively high temperatures, especially in the medium temperature range of 150° to 300° C. The operational disruptions occasioned by deformation and corrosion in the heretofore known batteries cast with masses of synthetic resin, do not occur in the fuel cells and batteries constructed according to our invention. The fuel cells and batteries of our invention are also impervious with regard to electrolyte for relatively long periods of time so that disassembly of the fuel cell or battery because of damaged frames formed of synthetic material is unnecessary.

The metal frames for carrying the support skeleton or the electrodes according to our invention, are relatively easy to manufacture and are especially well suited for mass production. Consequently, fuel cells readily assembled therewith can be easily combined into a battery by alternatingly connecting the support skeletons and the electrodes in series, respectively. The sealing of the individual components with respect to one another is effected by means of the electrically nonconductive asbestos cover layers that are provided in the fuel cells so that the relatively costly circular tie rings employed conventionally for sealing the components are now superfluous and can be accordingly dispensed with.

We claim:
1. Fuel cell comprising a pair of electrodes spaced from one another, a porous support skeleton having electron-nonconductive cover layers at opposite sides thereof disposed in the space between said electrodes and containing fluid electrolyte, a metal profile frame carrying said support skeleton and provided with at least one supply duct and one discharge duct for electrolyte, and an elastic metal frame carrying each of said electrodes and located adjacent the frame for said support skeleton and separated therefrom by the respective electron-nonconductive cover layer, the frame for said electrodes being provided with respective supply and discharge ducts for fuel cell reactants.
2. Fuel cell according to claim 1, including electrode chambers located respectively on the side of said electrodes opposite from said support skeleton, said chambers being enclosed by a respective plate member, said elastic metal frame being firmly connected to said plate member.
3. Fuel cell according to claim 1, wherein said cover layers are formed of asbestos.
4. Fuel cell according to claim 3, wherein said cover layers are hydrophobic respectively in regions located between said metal frames.
5. Fuel cell according to claim 4, wherein said hydrophobic regions of said asbestos cover layers are impregnated with hydrophobic plastic material.
6. Fuel cell according to claim 1, wherein said electrodes are at least partly formed of pulverulent catalyst material, and at least one layer of perforated sheet material retaining said pulverulent catalyst material in position.
7. Fuel cell according to claim 6, wherein said perforated sheet material is a screen.
8. Fuel battery formed of fuel cells according to claim 2, wherein respectively two electrodes and electrode chambers are located in a metal frame, and a plate member is connected to said metal frame so as to separate said electrode chambers one from the other.
9. Fuel battery according to claim 8, wherein said plate member separating said electrode chambers is formed with a plurality of grooves therein.
10. Fuel battery according to claim 8, wherein said electrolyte supply ducts, said electrolyte discharge ducts, said respective reactant supply ducts and said respective reactant discharge ducts for the cells in the battery are respectively connected by manifolds to one another.